United States Patent Office 3,048,047
Patented Aug. 7, 1962

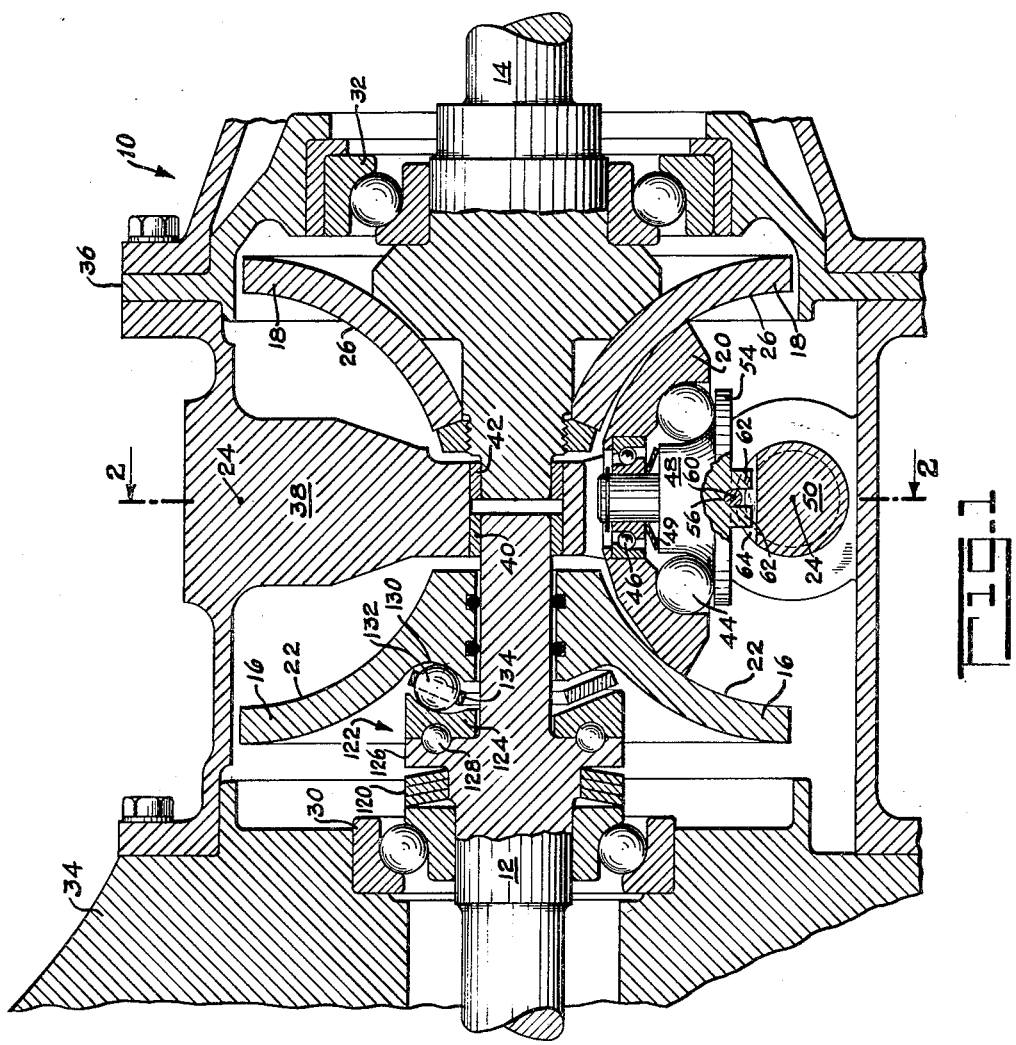

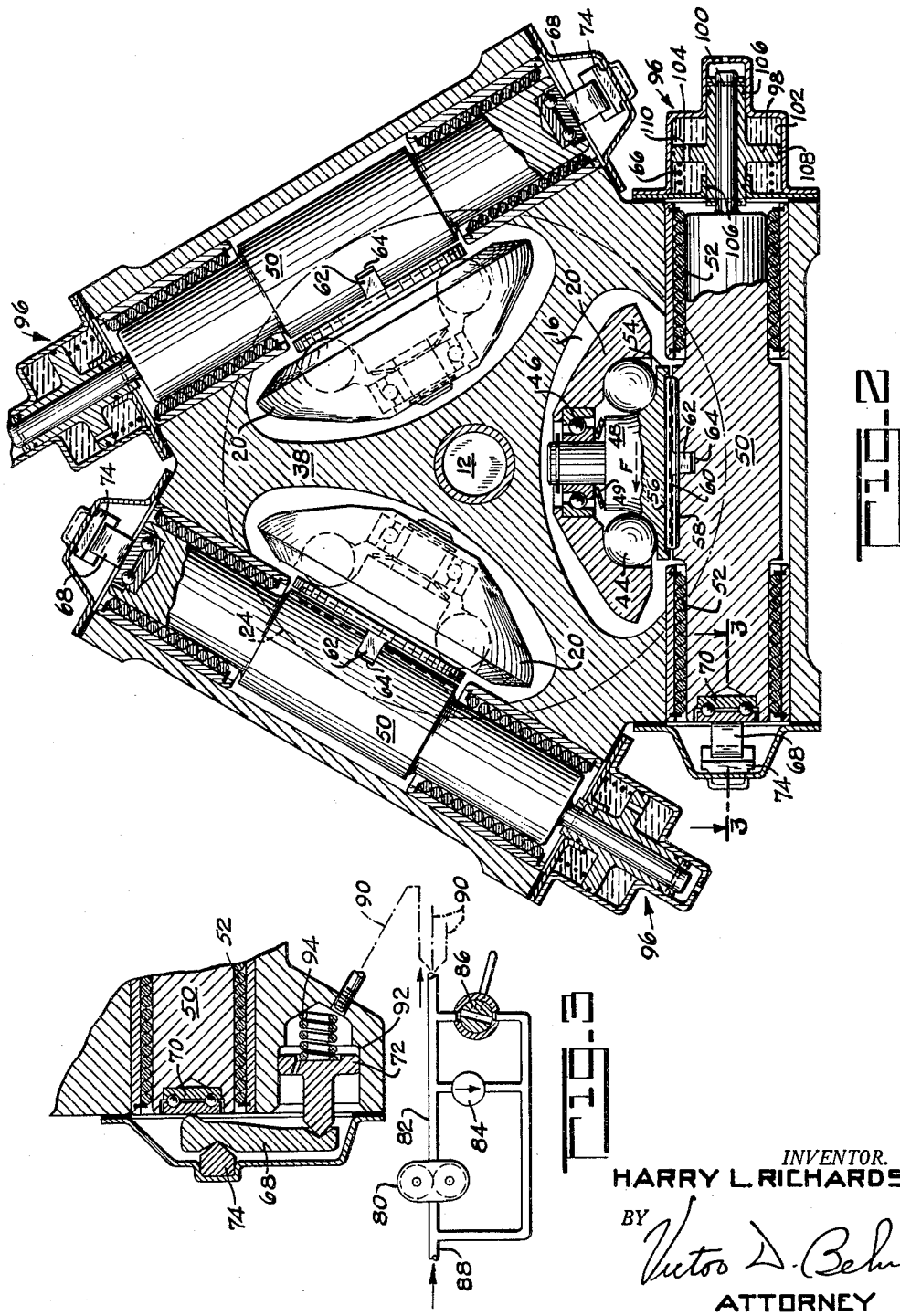

3,048,047
TOROIDAL TRANSMISSION DAMPING
MECHANISM
Harry L. Richardson, River Edge, N.J., assignor to Curtiss-Wright Corporation, a corporation of Delaware
Filed Mar. 8, 1961, Ser. No. 94,289
10 Claims. (Cl. 74—200)

This invention relates to variable speed-ratio transmissions and is particularly directed to stepless variable speed-ratio transmissions of the toroidal type.

Such transmissions comprise a pair of drive members having facing toroidal or toric surfaces with a plurality of rollers (preferably three) disposed between and in friction driving contact with said surfaces and with each roller mounted for speed-ratio changing movement or precession of its axis of rotation to change the speed-ratio of the driving connection provided by the rollers between the toroidal members. A transmission of this type is disclosed in co-pending application Serial No. 858,914 filed December 11, 1959, and now Patent No. 3,008,337.

In the toroidal transmission disclosed in said co-pending application, the traction drive forces on each roller are balanced against a controllable hydraulic force such that any unbalance between said control force and the traction drive forces causes the roller to move in a manner inducing speed-ratio changing precession of the roller to a position in which the forces on said roller are again in balance. Said co-pending application also discloses damping means utilizing the same liquid providing said controllable control force for damping said precession inducing movements of each roller.

An object of the present invention resides in the provision of novel means for damping said precession inducing movements of each roller.

In accordance with the invention a sealed hydraulic damping means is associated with each roller for damping precession inducing movements of said roller. With this construction the liquid used in such sealed damping means can be chosen solely from the standpoint of the properties desired for said damping purposes.

Other objects of the invention will become apparent upon reading the annexed detailed description along with the drawing in which:

FIG. 1 is an axial sectional view through a toroidal-type transmission embodying the invention;

FIG. 2 is a sectional view along line 2—2 of FIG. 1; and

FIG. 3 is a partial sectional view taken along line 3—3 of FIG. 2.

The transmission illustrated has been specifically designed for automotive use. It will be apparent, however, that the use of the transmission is not so limited and that instead the transmission is of general application.

Referring now to the drawing, a transmission 10 is illustrated as comprising co-axial input and output shafts 12 and 14 respectively, input and output toroidal disc members 16 and 18 co-axially mounted on and drivably connected to the shafts 12 and 14, respectively, and a plurality of circumferentially-spaced rollers 20 disposed between and in driving engagement with the toric surfaces of the disc members 16 and 18. Preferably, as illustrated, three rollers 20 are provided between the toroidal members 16 and 18. Also at least one of the toroidal disc members 16 and 18 is axially movable toward the other. For this purpose the disc member 16 is supported on the input shaft 12 for axial movement therealong.

The input toroidal disc member 16 has a toroidal surface 22 which preferably is generated by rotating a substantially circular arc about the common axis of the input and output shafts 12 and 14, the center of the generating arc tracing the circle 24 as the toric surface 22 is generated. The output toroidal disc member 18 has a similar toroidal surface 26 facing the input toroidal surface 22 and has substantially the same toroidal center circle 24.

The shafts 12 and 14 are supported by bearings 30 and 32 in a multi-part housing including end sections 34 and 36 and an intermediate section 38 secured to said end sections. The intermediate housing section 38 is a Y-shaped frame structure between which the three rollers 20 are disposed, said Y-shaped structure providing end bearings 40 and 42 for the adjacent ends of the shafts 12 and 14.

Each roller 20 is journaled by bearings 44 and 46 on a spindle 48, said bearings of each roller 20 being designed to support their roller against radial loads and to support their roller 20 against thrust radially outward relative to the transmission axis and along its spindle 48. The axis of each roller spindle 48 lies substantially in a radial plane including the transmission axis. A spring 49, preferably in the form of a Belleville washer, is disposed between the inner race of the bearing 46 and a shoulder on the spindle 48 so that the axial thrust on the roller 20 serves through its bearing 46 to compress the spring 49 thereby to distribute the axial thrust between the bearings 44 and 46. Since the Belleville spring 49 is disposed between the bearing 46 and the spindle 48 it serves to limit the thrust load carried by said bearing 46, said bearing having a substantially smaller load carrying capacity than the bearing 44.

Each roller spindle 48 is supported by a pivot shaft 50 for speed-ratio-changing movement of its roller about the axis of its said pivot shaft and relative to the toric surfaces 22 and 26. Relative to the transmission axis, each roller 20 is disposed on the radially inner side of its associated pivot shaft 50. The axis of each pivot shaft 50 is substantially tangent to the toroidal center circle 24 and is disposed in a plane perpendicular to the transmission axis. Thus the pivot shafts 50, like the rollers 20, are circumferentially spaced about the transmission axis, there being one pivot shaft 50 for each roller.

Each pivot shaft 50 is journaled in roller bearings 52 carried by the housing intermediate section 38. Each roller spindle 48 has an end plate 54 having a substantially semi-cylindrical groove 56 facing a corresponding groove 58 in the surface of an enlarged central portion of its associated pivot shaft 50. Each such semi-cylindrical groove 56 and 58 is disposed parallel to the axis of its associated pivot shaft 50. A pin 60 is received in each facing pair of grooves 56 and 58 so that through its pin 60 the associated roller 20 is supported by the shaft 50 for speed-ratio-changing movement of the roller with and about the axis of its shaft 50.

Each pin 60 also permits a limited pivotal movement of its associated roller 20 about the axis of said pin to equalize the contact pressures of said roller against the toric surfaces 22 and 26.

Each pivot shaft 50 has a limited movement along its axis and its associated roller spindle end plate 54 has tongues or lugs 62 received within a cross-slot or groove 64 in the shaft 50 so that movement of a shaft 50 along its axis results in a corresponding movement of its roller 20 in this direction. Obviously, since the cross-slot 64 on each pivot shaft 50 is disposed at right angles to the adjacent pin 60, this engagement between each pivot shaft cross-slot 64 and the roller spindle lugs 62 does not interfere with limited pivotal movement of the associated roller spindle 54 about the axis of the pin 60 to equalize the contact pressures of the associated roller 20 against the toric surfaces 22 and 26.

Each pivot shaft 50 has a spring 66 urging it in one direction along its axis against a controllable force applied to the other end of said shaft by a lever 68 and a thrust bearing 70, there being one such lever 68 for each pivot shaft 50. A controllable fluid pressure (preferably hydraulic) is applied against the other end of each lever 68 by a piston 72, each lever 68 being pivotally supported intermediate its ends by a fulcrum 74. The function of the lever 68 is only to amplify the hydraulic pressure force of the piston 72 against the associated pivot shaft 50.

The direction of rotation of the transmission is such that as viewed in FIG. 2 the input toric member 16 rotates clockwise and therefore the traction forces F exerted by the toric members 16 and 18 on, for example, the lower roller 20 are directed toward the left. Any unbalance of the traction forces on a roller and the forces along and on its pivot shaft 50 results in movement of the roller and its pivot shaft 50 along the axis of said shaft. As fully explained in the aforementioned co-pending application such movement of a roller 20 along the axis of its pivot shaft 50 results in precession, or speed-ratio-changing pivotal movement of the roller with and about the axis of its pivot shaft 50 to a speed-ratio position in which said forces are again in balance.

As is known, speed-ratio-changing precession of the rollers may also be produced by tilting of each roller about an axis through or parallel to a line through the points of contact of the roller with the toric members 16 and 18. As is also disclosed in said co-pending application, if such a roller tilt axis is offset from a line through the roller points of contact with the toric members, then the traction forces exerted by the toric members 16 and 18 on each roller apply a turning moment on the roller about its tilt axis which may be balanced by the hydraulic control force. Accordingly, it is within the scope of this invention to use such roller tilting to induce speed-ratio changing precession of the rollers instead of shifting of each roller along the axis of its pivot shaft 50.

The control pressure for controlling the speed-ratio position of the rollers 20 is supplied by a pump 80 to a conduit 82. A pressure relief valve 84 serves to limit the output pressure of the pump 80 and a controllable by-pass valve 86 serves when open to by-pass fluid from the pump output conduit 82 back to the input supply line 88 of the pump. In this way the output pressure of the pump 80 can be raised or lowered by closing or opening, respectively, the by-pass valve 86.

The control pressure or output line 82 of the pump 80 is connected by a conduit 90 to a cylinder 92 for each piston 72, there being one line 90 for each roller 20. The arrangement is such that the control pressure supplied to each cylinder 92 acts against its piston 72 whereby said piston through its lever 68 acts on the associated pivot shaft 50 to oppose the spring 66 and the traction forces F on the associated roller. A spring 94 is also provided to maintain the piston, lever 68 and shaft 50 in contact with each other. With this arrangement each roller 20 automatically and independently of the other rollers moves to a speed-ratio position in which the traction forces on said roller, the hydraulic control pressure force exerted on the pivot shaft 50 of said roller and the forces of the springs 66 and 94 on said pivot shaft are in balance. The magnitude of the forces of the springs 66 and 94 on the associated pivot shaft 50 are small compared to that of the hydraulic control force and traction forces. Also because the range of movement of each pivot shaft 50 along its axis is small the forces of the springs 66 and 94 thereon are substantially constant.

The end of each roller pivot shaft 50 remote from the control pressure lever 68 is provided with a fluid dash pot device 96 for damping precession inducing movements of the associated roller. That is, each damping device 96 is provided for damping motion of its pivot shaft 50 and roller 20 in a direction parallel to the axis of said shaft. For this purpose each shaft 50 has a reduced diameter end portion on which a piston-like member 98 is secured as by pins 100. The piston 98 is slidable within a cylindrical space 102 formed by a casing member 104 secured to the adjacent portion of the transmission housing section 38. The cylindrical space 102 is filled with a damping fluid which preferably is a liquid whose viscosity is high and changes relatively little with temperature changes, such as a high viscosity silicone oil. Seals 106 are provided to seal the ends of the cylindrical space 102 and a seal 108 is provided around the periphery of the piston 98. The piston 98, however, has a restricted opening 110 therethrough for passage of the damping fluid therethrough from one side of the piston 98 to the other.

The damping fluid and restricted opening are selected so that the damping constant of each damping device 96 is within the range of 2000 to 8000 pounds per inch per second and preferably is approximately 5000 pounds per inch per second. For this purpose each damping device 96 has its cylindrical space 102 filled with a silicone fluid having a high viscosity. By using a high viscosity damping fluid it is possible to obtain the desired damping force with a restricted damping passage 110 having a minimum diameter which is sufficiently large so that there is little or no danger of said passage becoming clogged. A silicone fluid having a viscosity, in centistokes at 100° F., of approximately 12,500 has been found to be satisfactory. With this high viscosity damping fluid an adequate damping force is provided by each damping device 96 with its damping piston 98 having an effective area of approximately 1.25 square inches and having a restricted passage 110 with a minimum diameter of about 0.04 inch.

Since each damping device 96 has its damping fluid sealed therein, there is little or no danger of foreign ingredients getting into the damping fluid and possibly clogging its restricted damping passage 110.

As also shown on the drawing, the input toroidal disc member 16 is axially movable toward the output toroidal disc member 18 for squeezing the rollers 20 therebetween. For this purpose a Belleville washer type spring 120 acts through a cam and sprag device 122 for axially urging the toroidal disc member 16 toward the toroidal disc member 18. The spring 120 thereby provides the initial contact pressure or pre-load of the rollers 20 against the toroidal disc members 16 and 18. The cam and sprag device 122 comprises an annular cam member 124 which is keyed to a shoulder 126 on the input shaft 12 by a plurality of balls 128 received in facing semi-spherical pockets in said shoulder and cam member. The cam and sprag device 122 also includes a cam portion 130 on the input toroidal disc 16. The cam member 124 has a plurality of circumferentially-spaced cam recesses each facing a corresponding cam recess on the cam portion 130. In addition a sprag 132, which is illustrated in the form of a spherical ball, is disposed within each facing pair of said cam recesses and a cage 134 is provided for maintaining the sprags 132 in position. Upon application of torque to the input shaft 12 the cam member 124 rotates relative to the cam portion 130 to wedge the sprags 132 therebetween for transmitting said torque and thereby axially loading the toroidal disc members toward each other against the rollers. The details of the pre-load spring 120 and the cam and sprag device 122 for loading the toroidal disc members 16 and 18 against the rollers 20 form no part of the present invention.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A variable speed transmission comprising co-axial input and output members having facing toric surfaces; a plurality of circumferentially-spaced rollers disposed between and in driving contact with said surfaces for transmitting torque from the input member to the output member; support means for each roller including pivot means providing for speed-ratio-changing pivotal movement of said roller across said toric surfaces; each roller support means also including means providing for movement of its roller in a second mode in response to changes in the traction forces between said roller and said toric surfaces such that in response to movement in said second mode said speed-ratio changing pivotal movement of the roller is initiated; means including a source of controllable fluid pressure operatively connected to each roller to subject each roller to a control force opposing said traction forces such that each roller automatically moves to a speed-ratio position in which the forces thereon are in balance; and a plurality of sealed, individual, fluid damping devices, there being one such damping device for and operatively connected to each roller for damping movements of said roller in said second mode.

2. A variable speed transmission as claimed in claim 1 and in which each said fluid damping device has a silicone damping liquid.

3. A variable speed transmission as claimed in claim 1 and in which each said fluid damping device comprises a piston element and cylinder element assembly filled with a liquid with the movable one of said elements being connected to its associated roller, said assembly having a restricted passage for transfer of said liquid from one side to the other of its piston.

4. A variable speed transmission as claimed in claim 3 and in which said liquid is a silicone liquid having a viscosity of approximately 12,500 centistokes at 100° F.

5. A variable speed transmission as claimed in claim 1 and in which each said roller pivot means comprises a pivot shaft movable along its axis and connected to its roller such that said speed-ratio-changing pivotal movement of said roller constitutes pivotal movement of the roller about the axis of said shaft and movement of the roller in its said second mode constitutes translational movement of said roller with its shaft in a direction parallel to the axis of said shaft.

6. A variable speed transmission as claimed in claim 5 and in which said fluid pressure control force is applied to one end of each roller pivot shaft and the associated fluid damping device is connected to the other end.

7. A variable speed transmission as claimed in claim 6 and in which each said fluid damping device comprises a piston element and cylinder element assembly filled with a silicone liquid and having its movable element connected to said other end of the pivot shaft of its associated roller for movement with said shaft along the shaft axis, and in which said assembly has a restricted passage for transfer of said liquid from one side to the other of its piston.

8. A variable speed transmission as claimed in claim 7 and in which said silicone liquid has a viscosity of approximately 12,500 centistokes at 100° F.

9. A variable speed transmission as claimed in claim 8 and in which said restricted passage has a minimum diameter at least equal to about 0.04 inch and in which each fluid damping device has a damping coefficient within the range of 2,000 to 8,000 pounds per inch per second.

10. A variable speed transmission as claimed in claim 6 and in which each fluid damping device has a damping coefficient within the range of 2,000 to 8,000 pounds per inch per second.

References Cited in the file of this patent

UNITED STATES PATENTS

| | | |
|---|---|---|
| 1,698,229 | Hayes | Jan. 8, 1929 |
| 2,201,176 | Hayes | May 21, 1940 |
| 2,748,614 | Weisel | June 5, 1956 |
| 2,959,063 | Perry | Nov. 8, 1960 |